A. P. NELSON.
TONGS.
APPLICATION FILED MAR. 8, 1918.
1,274,187.
Patented July 30, 1918.
Fig. 3.
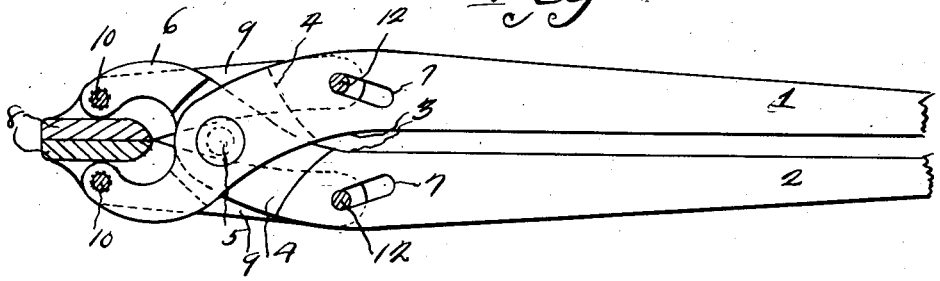
Fig. 2.
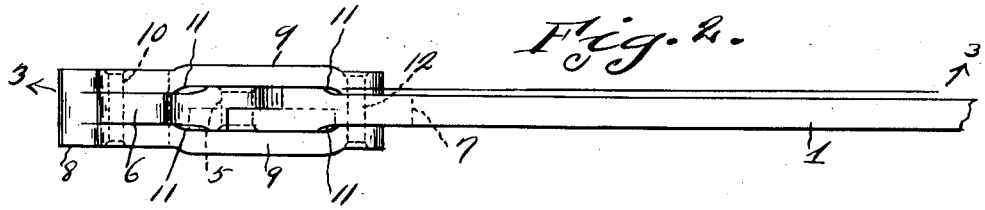
Fig. 1.
Witnesses
Inventor
A. P. Nelson
By D. Swift & Co.
Attorneys

UNITED STATES PATENT OFFICE.

AUGUST P. NELSON, OF OBERON, NORTH DAKOTA.

TONGS.

1,274,187.

Specification of Letters Patent.

Patented July 30, 1918.

Application filed March 8, 1918. Serial No. 221,149.

*To all whom it may concern:*

Be it known that I, AUGUST P. NELSON, a citizen of the United States, residing at Oberon, in the county of Benson, State of North Dakota, have invented a new and useful Tongs; and I do hereby declare the following to be a full, clear, and exact description of the invention, such as will enable others skilled in the act to which it appertains to make and use the same.

This invention relates to a pair of improved tongs adapted for use in holding metal and the like in metal working.

One of the objects of the invention consists in the provision of a pair of improved tongs having parallel gripping jaws.

A further object of the invention is the provision of means for guiding the jaws in parallelism when closing and opening.

A further object of the invention is the provision of means for reinforcing said parallel jaws.

A further object of the invention is to provide a device of this kind which consists of improved features of construction.

One of the features of construction is the provision of a pair of parallel jaws, each having a pair of spaced arms between which a curved end of one of the levers for actuating the jaws is pivoted, so as to act as guiding means for the jaws.

In practical fields the details of construction may necessitate alterations falling within the scope of what is claimed.

The invention comprises further features and combination of parts as hereinafter set forth shown in the drawings and claimed.

In the drawings:—

Figure 1 is a plan view of a pair of tongs constructed in accordance with the invention, showing the parallel jaws open, Fig. 2 is an edge view, and Fig. 3 is a sectional view on line 3—3 of Fig. 2.

Referring more especially to the drawings 1 and 2 designate a pair of handle members, which are curved toward each other as shown at 3 and said curved parts 3 have their adjacent faces cut away or provided with recesses 4, the faces of said recesses engaging, so that by pivoting the handle members together by means of the pin 5, said handle members are directly opposed to each other. Beyond the pivot pin 5, the handle members 1 and 2 have curved parts 6. Said handle members are also provided with obliquely arranged slots 7. The gripping or clamping jaws 8 consist of broad plates, each of which has a pair of spaced arms 9. These arms extend in such relation from the plates 8 or jaws as to protrude in the direction of the handle members 1 and 2, so as to straddle the curved parts 6 and 3 of the handle members. In fact the handle members engage between the arms 9, and have their curved portions 6 pivoted between said arms on the pins 10. The handle members where they intersect or cross are thickened as is clearly seen in Fig. 2, and in order that the arms 9 may straddle the curved parts of the handle member, said arms are slightly bowed as shown at 11. By means of the pins 12, the rear ends of the arms 9 are pivotally connected in the slots 7 of the handle members. By means of the pins 12 and the slots 7 connecting the arms 9 to the handle members, the jaws 8 are held in parallelism at all times during the opening and closing action of said handle members, and by holding the jaws in such parallelism, metal pieces may be securely and firmly clamped between said jaws.

The invention having been set forth what is claimed as new and useful is:—

The combination with a pair of opposing flat parallel jaws, of a pair of handle members having their corresponding ends crossed and pivoted together; said pivoted ends being curved outwardly in opposite directions beyond the pivot and having their extremities terminating adjacent the outer faces of the jaws, the outer faces of said jaws being each provided with a pair of arms extending rearwardly in the direction of the handle member, said arms being in spaced parallelism for the reception of the curved end parts of the handle member, whereby the jaws are guided in registration and in parallelism with each other, means for pivoting the extremities of the curved end parts between the arms adjacent the outer faces of the jaws, the rear ends of the arms having slot and pin connections with said handle members.

In testimony whereof I have signed my name to this specification in the presence of two subscribing witnesses.

AUGUST P. NELSON.

Witnesses:
JOHN ELLISON,
WALTER NELSON.